Aug. 9, 1955  H. L. BEEKLEY  2,715,009
BELLOWS OPERATED SELF ALIGNING VALVE
Filed April 15, 1949  2 Sheets-Sheet 1
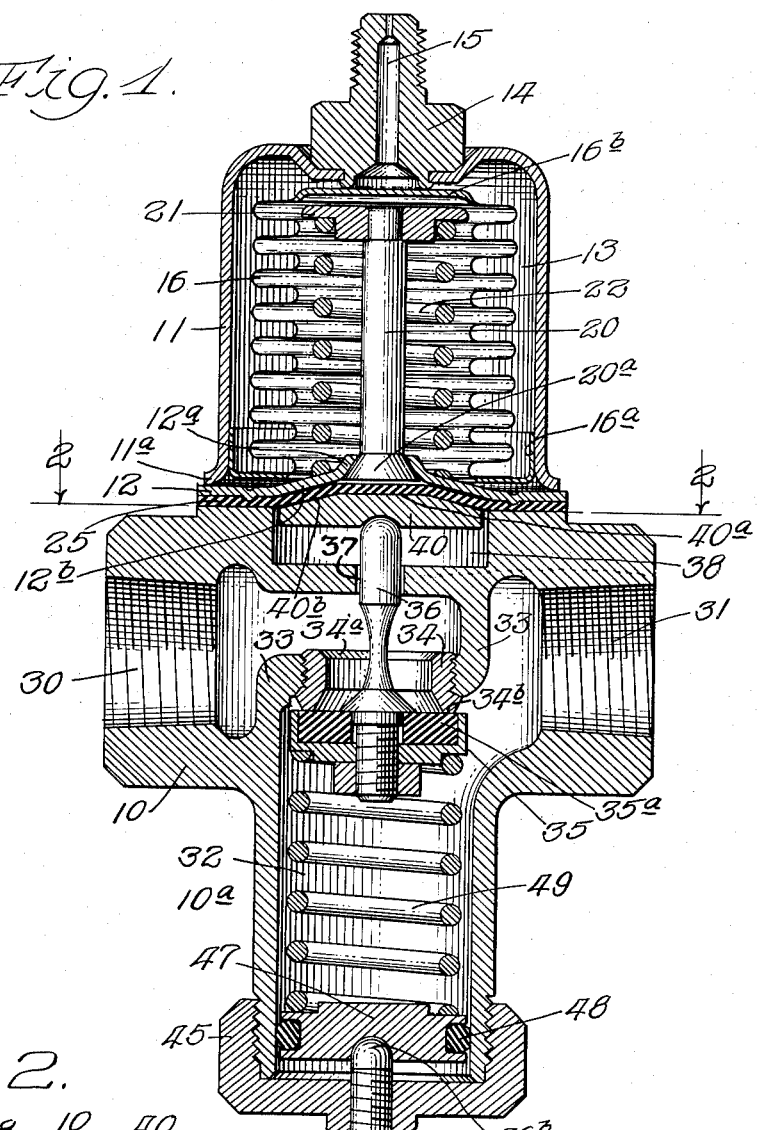
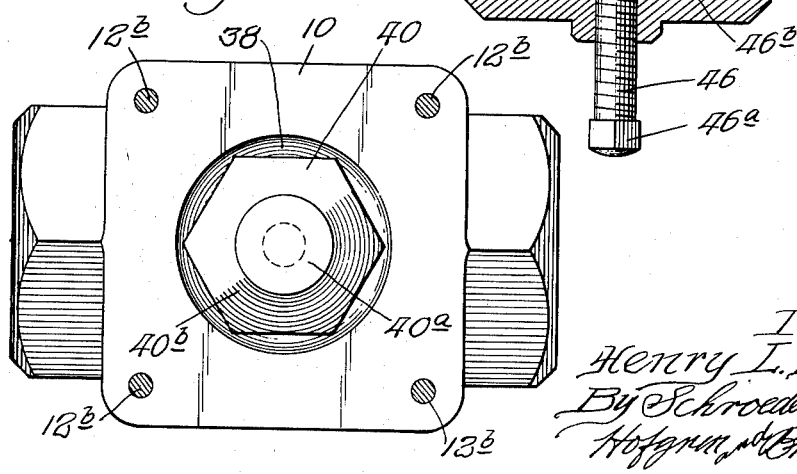
Inventor:
Henry L. Beekley,
By Schroeder, Merriam,
Hofgren & Brady, Attys.

Aug. 9, 1955     H. L. BEEKLEY     2,715,009
BELLOWS OPERATED SELF ALIGNING VALVE

Filed April 15, 1949     2 Sheets-Sheet 2

Inventor:
Henry L. Beekley,
By Schroeder, Merriam,
Hofgren and Brady, Attys

United States Patent Office 2,715,009
Patented Aug. 9, 1955

2,715,009

BELLOWS OPERATED SELF ALIGNING VALVE

Henry L. Beekley, Glen Ellyn, Ill., assignor, by mesne assignments, to Electrimatic Company, a corporation of Illinois Application April 15, 1949, Serial No. 87,778

3 Claims. (Cl. 251—61)

This invention relates to a valve, and more particularly to a valve adapted to regulate the amount of flow of fluid therethrough.

One feature of this invention is that it provides an improved valve; another feature of this invention is that it provides a valve wherein the valve member adapted to control the flow of fluid has an extending portion adapted to be operated by an actuating member and means are provided for guiding the extending portion to permit limited angular movement thereof; a further feature of this invention is that it provides a valve having means for resiliently supporting said valve member for limited angular movement; still another feature of this invention is that said extending portion of the valve member is movably engaged by a pressure member which is loosely carried in the valve and is adapted frictionally to engage a portion of the valve operating means to insure proper positioning of the valve member; another feature of this invention is that the pressure member is generally polygonal and is loosely carried in a cylindrical recess, thus providing means for insuring against undesired retarding of movement of the pressure member by friction at its side edges; still another feature of this invention is that it provides a single sealing means in a valve having an open ended operating chamber with a removable cap, said cap having an opening therethrough; yet a further feature of this invention is that it provides, in a valve having a spring for resiliently supporting the valve member, seating means for the spring, this seating means being angularly movable to compensate for spring irregularities and to eliminate misalignment forces on the valve member; and still an additional feature of this invention is that it provides a movable pressure responsive valve actuating member and means for mounting said member under biasing pressure to permit movement only in response to pressures in excess of a predetermined value greater than the pressure otherwise required to move said member.

Other features and advantages of this invention will be apparent from the following specification and the drawings in which:

Fig. 1 is a longitudinal section through a valve constructed in accordance with the present invention, the valve being shown in closed position before normal operating pressure is applied;

Fig. 2 is a transverse section along the line 2—2 of Fig. 1;

Figure 3:
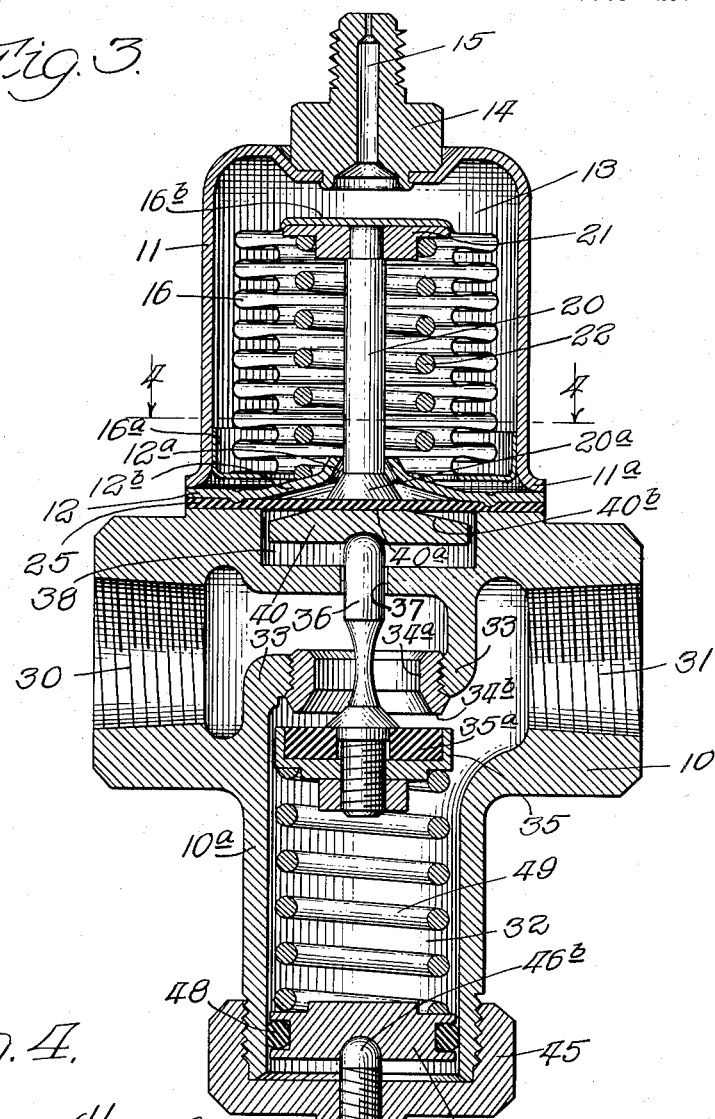
Fig. 3 is a longitudinal section of the valve of Fig. 1 under normal operating pressure.
Figure 4:
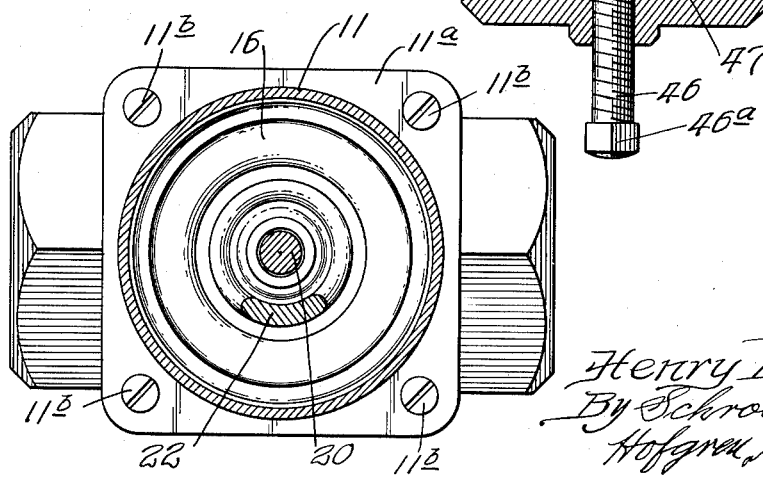
Fig. 4 is a transverse section along the line 4—4 of Fig. 3.

Referring now more particularly to the drawings, the valve comprises basically a valve body 10 having a pressure housing and actuating means removably mounted thereon. This housing is formed by a dome 11 having a flanged base 11a adapted to be removably mounted on the valve body by means of screws 11b. Between the housing and the valve body is an intermediate member 12 which has a center portion recessed into the dome as shown at 12b in Figs. 1 and 3. The housing formed by the member 11 has a pressure chamber 13 and the intermediate member 12 has a central opening 12a communicating with the housing for actuating the valve. The dome member 11 has an upper opening through an attached coupling member 14, this coupling member having a bore 15 for connection to a source of pressure.

A member 16 having a movable pressure responsive portion within the housing comprises a Sylphon bellows the interior of which communicates with the actuating opening 12a in the member 12, and the exterior of which communicates with pressure fluid in the chamber 13. The bellows is sealed in a fluid tight manner within the housing by means of a flange 16a which may be soldered or secured in other conventional sealing manner to the bottom of the bellows and to the interior of the dome 11 to close the bottom portion of the pressure chamber 13. The bellows 16 has a portion 16b which is movable in response to pressure within the chamber, this movable pressure responsive portion being shown in its uppermost or relaxed position in Fig. 1.

A valve actuating member 20 extends within the bellows and is adapted to be operated by the movable portion 16b of the bellows. The member 20 is in the form of a rod and has a pressure member 21 mounted on the upper end thereof, this pressure member being adapted to be engaged by the portion 16b of the bellows as shown in Fig. 3 to distribute the actuating pressure over a wide surface area on the portion 16b and to prevent damage thereto. The lower end of the actuating member 20 extends through the opening 12a in the member 12 and is flanged as shown at 20a, this flange cooperating with the walls of the opening 12a in the member 12 to form a stop to prevent upward movement (as the parts appear in Figs. 1 and 3) of the actuating member beyond the position shown in Fig. 1. A spring 22 surrounds the actuating member 20, one end of the spring abutting against the member 12 and the other end of the spring abutting against an annular shoulder on the member 21. The spring 22 is compressed preferably to a value substantially equal to the minimum head pressure to be encountered with the pressure fluid utilized, and consequently the spring biases the member 20 and permits movement of the member 20 only in response to pressures in excess of a predetermined value greater than the pressure otherwise required to move the pressure responsive portion 16b.

It will be seen that the bellows 16 is carried by the dome 11 and is in sealing engagement therewith at the bottom to form the pressure chamber 13, while the actuating rod 20 and spring 22 are carried by the member 12. Despite the fact that the spring is under substantial pressure to place a bias on the rod 20 to permit movement of said rod only in response to substantial pressures the housing may readily be assembled because the stop means formed by the flange 20a and the walls of the opening 12a keep the spring under pressure and insure that the length of the spring and rod assembly is no greater than (and preferably is less than) the length of the Sylphon bellows. Consequently, the actuating housing may be easily assembled by merely placing the intermediate member 12 over the open end of the dome 11 with the spring and rod assembly within the bellows as shown and the entire assembly may then be secured to the body 10 of the valve by means of the screws 11b. Despite this ease of assembly a bias is provided on the actuating rod 20 and said actuating rod will be moved downward only under substantial pressures greater than the pressure otherwise required.

For example, in certain refrigerating systems where Freon is the pressure fluid, the minimum head pressure encountered is of the order of 80 pounds. Consequently the spring 22 is factory set at about 80 pounds before the valve is assembled. Even with this substantial bias on the actuating rod the apparatus is easily assembled and no internal pressures are placed upon the bellows 16 since, as may be seen in Fig. 1, when no external or actuating pressure is applied to the bellows the movable portion of the bellows need not even engage the pressure member 21. On the other hand, when actuating pressure is applied through the bore 15 the portion 16*b* of the bellows may move down into engagement with the pressure member 21, but no movement of the actuating rod 20 occurs until the external pressure exceeds the predetermined bias of the spring. When this actuating pressure exceeds the bias the actuating member 20 moves downwardly as shown in Fig. 3 a distance determined by the pressure differential between the actuating pressure and the bias pressure, and the flange 20*a* moves away from the walls of the opening 12*a*. However, if the pressure in the chamber 13 is removed, the stop means limit the movement of the actuating rod 20 in response to the force exerted by the biasing spring and prevent said spring from exerting force against the movable portion 16*b* of the Sylphon.

As seen in Figs. 1 and 3 the actuating rod operates through the medium of a flexible diaphragm 25 which is interposed between the member 12 and the valve body and which serves to seal the top of the valve body.

The valve body 10 preferably comprises a single casting having a threaded inlet 30, a threaded outlet 31, and a lower tubular portion 10*a* defining an open ended operating chamber 32. A partition 33 separates the inlet and the outlet, said partition having a flow opening therethrough formed by a valve seating member 34 which is threaded into the partition, this member having a bore 34*a* defining the flow opening and having a portion 34*b* defining an annular seat adjacent the operating chamber 32.

A valve member 35 is adapted to control the flow of fluid through the opening 34*a*, this valve member carrying packing 35*a* adapted to engage the annular seat as is conventional. The valve member has a portion 36 which extends through the flow opening 34*a* and through an opening 37 in the top wall of the valve body on the opposite side of the partition 33 from the chamber 32 into a cylindrical recess 38 formed in the top of the valve body 10. The top of the member 36 is rounded as shown in Figs. 1 and 3 and is swively engaged by a pressure member 40 having an axial indentation in its under surface adapted to cooperate with the rounded end of the extending portion 36. As shown in Figs. 1 and 3 the opening 37 has a diameter somewhat larger than the diameter of the extending portion 36 to permit limited angular movement of the extending portion and, as shown best in Fig. 2 the pressure member 40 is loosely carried within the recess 38, this pressure member preferably being generally polygonal in order to insure that at least a portion of the sides of the pressure member will be spaced from the wall of the recess 38 to avoid undesired friction. While the pressure member is illustrated as being hexagonal, it will be understood that the term "generally polygonal" is intended to include any configuration which provides that one portion of the sides of such pressure member is necessarily closer to the wall of the cylindrical recess 38 than another portion of the sides of the pressure member, this construction obviating the possibility of any undesired friction in the operation of the valve. Referring again to Fig. 1, the top surface of the pressure member has a central area portion generally parallel with the bottom surface of the pressure member and adapted to cooperate with the flanged end 20A of the actuating rod 20, and said top surface has a tapered peripheral area portion designated at 40*b* so that the configuration of the top of the pressure member conforms generally to the recess in the member 12.

The tubular portion 10*a* of the valve body is externally threaded adjacent its open end to receive a removable cap 45, this cap having an adjusting stud 46 threaded therethrough and extending axially of the portion 10*a*. The stud 46 has its outer end 46*a* formed to receive a wrench or other turning tool, and the inner end 46*b* of the stud preferably is rounded. A disk-like member 47 is seated on the stud, this member having an axial indentation in its lower surface so that it may be swively seated on the stud 46. The disk-like member 47 has a diameter smaller than the bore of the chamber 32 and has an annular groove containing packing material 48 adapted to engage the wall of the chamber 32 to provide a seal for the cap 45 and the stud 46, this single seal replacing the plurality of seals heretofore found in valves having two openings.

A spring 49 is seated on the member 47 and resiliently supports the valve member 35. As seen in Figs. 1 and 3 the spring 49 has a diameter smaller than the bore of the chamber 32, and the construction and swivel mounting of the disk-like member 47 permits angular movement of said member to insure proper alignment of the valve member 35, since any spring irregularities and angular misalignment forces will be corrected by angular movement of the member 47 at the bottom of the chamber 32 and will not affect the valve member 35 or act to misalign said valve member.

There are three principal advantages found in the novel construction above disclosed, these being low cost of manufacture, ease of assembly and automatic centering of the parts in operation.

Regarding the first advantage, it has heretofore been necessary in valves of this type to provide precise machining between the operating parts. For example, in many such valves an operating piston has been used and the dimensions of the parts were necessarily very accurate with very small tolerances, thereby requiring expensive machining operations. In my improved valve machining of parts is at a minimum. It will be noted that there are no close tolerances to be met in the construction of the actuating housing, particularly since it is not necessary that the actuating rod engage the movable portion 16*b* of the bellows when the parts are in unstressed condition. Furthermore, the provision of the actuating rod acting through the diaphragm 25 against the pressure member 40 and the further provision of a generally polygonal shape for this pressure member in a cylindrical recess insures perfect sealing and proper operation with no machined parts. Similarly, in the structure near the bottom of the valve housing neither the spring 49 nor its seating member 47 need be fit with close tolerance in the chamber 32 since the angular movement of the member 47 automatically compensates for any misalignment forces.

In assembling the valve it is merely necessary to place the housing 11, the intermediate member 12 and the diaphragm 25 on the top of the valve housing and secure them with screws 11*b* as earlier explained after the pressure member 40 has been placed in the recess 38. Inasmuch as the pressure member is loosely carried in the recess, and inasmuch as the diameter of the opening 37 in the top of the body 10 is greater than the diameter of the extending portion 36 of the valve member, the valve member is centered before any pressure is applied and upon the application of pressure the pressure member frictionally engages the diaphragm 25 and holds the valve member against misalignment even though there is a loose fit of the extending portion 36 in the opening 37. In the same manner the angularly movable disk-like member 47 removes any possibility of misalignment of the valve member at the bottom, and as a further advantage in assembling the apparatus for operation (as pointed out earlier) the spring 22 has been factory set to provide a bias pressure on the actuating rod 20 approximately equal to the minimum head pressure to be encountered. When the apparatus is assembled for operation adjustment of the lower spring by turning the adjusting stud 36 may be made to adjust the valve for the desired type of regulatory operation.

Throughout all the steps of assembling the valve the parts have been automatically centered because of the movable mounting at the top and the frictional engagement of the pressure member with the diaphragm and because of the angular movability of the disk-like member 47 at the bottom, this member further providing a single seal where two seals have heretofore been necessary, this single seal serving for both the open end of the chamber which is sealed by the cap 45 and the opening in the cap for the stud 46.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A valve of the character described, including: a valve body having an inlet, an outlet and an operating chamber; a partition separating said inlet and outlet, said partition having a flow opening therethrough and said valve body having an opening into a cylindrical recess in a wall on the opposite side of said partition from said chamber; a diaphragm for sealing said recess; a valve member in said chamber adapted to control the flow of fluid through said flow opening, said valve member having a portion extending in only one direction therefrom, through said flow opening and through the opening into said recess, said extending portion having a diameter smaller than that of the opening in said recess; a generally polygonal pressure member having a seat swivelly engaging said extending portion, said pressure member having at least a portion of its sides spaced from the wall of said recess and being loosely carried in said recess and being adapted frictionally to engage said diaphragm, said extending portion having limited lateral movement; actuating means operative on said pressure member through said diaphragm for moving said valve member; a coil spring within said chamber for resiliently supporting said valve member; said spring having a diameter smaller than the bore of said chamber to permit limited angular movement of said valve member to provide automatic alignment of said valve member with said flow opening; and a stud threaded into said chamber for adjusting the tension of said spring.

2. In a valve of the character described, having a valve body with a flow opening therein, a valve member and an open ended operating chamber: a spring within said chamber for resiliently supporting the valve member adjacent the flow opening; a removable cap for the open end of said chamber; and means for providing a single seal within said chamber adjacent said cap, said means providing a seat for said spring and being mounted for angular movement about an axis in the plane of said means to insure proper alignment of said valve member.

3. In a valve of the character described, having a valve body with a flow opening therein, a valve member and an open ended operating chamber: a coil spring within said chamber for resiliently supporting the valve member adjacent the flow opening, said spring having a diameter smaller than the bore of said chamber; a removable cap for the open end of said chamber; a stud threaded through said cap and extending into said chamber; and a disk-like member swivelly seated on the extended end of said stud and providing a seat for said spring, said disk-like member having a diameter appreciably smaller than the bore of said chamber to permit angular movement of said member about an axis in the plane of said member to insure proper alignment of said valve member, and said disk-like member having an annular groove containing packing material adapted to engage the wall of said chamber to provide a seal adjacent said cap.

References Cited in the file of this patent

UNITED STATES PATENTS

| | | |
|---|---|---|
| 389,099 | Newman | Sept. 4, 1888 |
| 508,135 | Gold | Nov. 7, 1893 |
| 1,954,930 | Greenlee | Apr. 17, 1934 |
| 2,111,230 | Toussaint | Mar. 15, 1938 |
| 2,170,137 | George | Aug. 22, 1939 |
| 2,209,216 | Wile | July 23, 1940 |
| 2,270,037 | Corbin | Jan. 13, 1942 |
| 2,318,161 | Johnson | May 4, 1943 |
| 2,365,650 | Shaw | Dec. 19, 1944 |
| 2,400,044 | Hermanson | May 7, 1946 |
| 2,431,283 | Spence | Nov. 18, 1947 |
| 2,456,403 | Goehring | Dec. 14, 1948 |
| 2,468,489 | D'Arcy | Apr. 26, 1949 |
| 2,518,852 | Annin | Aug. 15, 1950 |